United States Patent Office 3,553,122
Patented Jan. 5, 1971

3,553,122
ESTER MODIFIED URETHANE DRYING OILS
Perry A. Argabright and Brian L. Phillips, Littleton, Colo., and Vernon J. Sinkey, Inver Grove Heights, Minn., assignors to Marathon Oil Company, Findlay, Ohio, a corporation of Ohio
No Drawing. Filed Feb. 25, 1969, Ser. No. 802,215
Int. Cl. C09d 3/64, 3/68, 3/72
U.S. Cl. 260—22
9 Claims

ABSTRACT OF THE DISCLOSURE

Urethane drying oils, and a method of preparing same, comprising reaction products of hydroxylated polyesters, organic dihalides and metal cyanates. The hydroxylated polyesters preferably comprise reaction products of a diacid or anhydride and hydroxyl-containing esters of polyols and unsaturated fatty acids.

CROSS REFERENCES TO RELATED APPLICATIONS

U.S. patent application Ser. No. 611,588 filed Jan. 25, 1967, Ser. No. 514,721, filed Dec. 16, 1965, Ser. No. 802,054 filed Feb. 25, 1969 and Ser. No. 786,405 filed Dec. 23, 1968, all assigned to the present assignee, relate to the general field of the present invention.

BACKGROUND OF THE INVENTION

Urethane drying oils offer advantages as coatings for wood and other surfaces where superior resistance to abrasion, chemical attack, and weathering is required. Various methods of preparing such oils are known. One method involves reacting an acid or acid anhydride with a hydroxyl-containing drying oil derivative. A diisocyanate is then reacted with the drying oil derivative to give a urethane drying oil. Urethane drying oils prepared by this method using commercially available aryl diisocyanates have a number of disadvantages, chief among which are their tendency to discolor and undergo degradation, especially when exposed to sunlight and weathering.

SUMMARY OF THE INVENTION

In accordance with the present invention, urethane drying oils have been evolved which not only demonstrate excellent resistance to sunlight and weathering, but also manifest excellent resistance to abrasion and attack by chemicals such as acids and alkalis. Briefly, the urethane drying oils of this invention comprise reaction products obtained by reacting hydroxylated polyesters with organic dihalides and metal cyanates in a solvent medium. The hydroxylated polyesters utilized in carrying out the reaction are derived from the reaction of a polycarboxylic acid, particularly a diacid, or the anhydride thereof, with hydroxyl-containing partial esters. The resulting drying oils have a formula corresponding generally to:

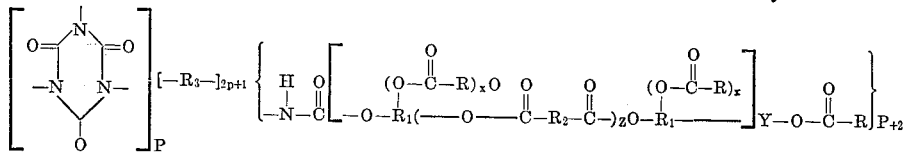

wherein R is a monovalent unsaturated hydrocarbon radical, preferably an aliphatic radical, containing from 1 to 5, especially desirably 1 to 3, double bonds, and having from 5 to 30, preferably 10 to 20 carbon atoms; $R_1$ is a polyvalent organic radical, especially an unsaturated or saturated aliphatic radical, or an aryl radical; $R_1$ may bear from 2 to 10 hydroxyl groups, preferably from 2 to 4; $R_2$ is a divalent organic radical, saturated or unsaturated containing from 2 to 20 carbons, preferably from 2 to 10 carbons; $R_3$ is an organic-divalent radical to which is attached the nitrogen atoms of the urethane and isocyanurate groups. $R_3$ may be saturated or unsaturated aliphatic, and preferably the carbons to which the nitrogens are attached are benzylic or allylic. While $R_3$ can contain internal unsaturation including aromaticity, the terminal carbon atom(s) of $R_3$ must be saturated. $R_3$ can contain from 2 to 30, preferably 2 to 20, and most preferably 2 to 12 carbon atoms. X is 1 to 5, especially desirably 1 to 3; and Z is 0 or 1; and p is the number of isocyanurate groups which preferably average from about 0.02 to about 15, more preferably from 0.05 to 10, and most preferably from 0.1 to 3. It should be understood that the R, $R_1$, $R_2$, and $R_3$ radicals or groups may be substituted or unsubstituted. In those instances where substituents are present on the radicals or groups, they should be non-interfering in character both from the standpoint of steric factors as well as chemical reactivity considerations.

The hydroxyl-containing partial esters having utility in forming the hydroxylated polyesters employed in the preparation of drying oils in accordance with the practice of the present invention advantageously are unsaturated partial esters containing either primary or secondary hydroxyl groups. More specifically, and especially desirably, the esters used as starting materials are hydroxyl-containing unsaturated partial esters of fatty acids which contain either primary or secondary hydroxyl groups, with primary hydroxyl groups being preferred. Preparation of such hydoxyl-containing unsaturated partial esters can be carried out by the partial transesterification of unsaturated fatty acid esters with a suitable polyol in the presence of a catalyst. The unsaturated fatty acid esters used in the partial transesterification reaction correspond generally to the formula:

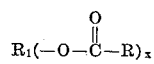

wherein $R_1$ is derived from a polyol exemplified by ethylene glycol, glycerol, trimethylol propane, pentaerythritol, and the like, and wherein the

group is derived from an unsaturated fatty acid such as those normally occurring in linseed oil, soybean oil, cottonseed oil, dehydrated castor oil, tung oil, safflower oil, peanut oil, or various fish oils, and the like, or wherein said group is derived from unsaturated fatty acids, such as oleic, linoleic, linolenic, palmitoleic, ricinoleic, and the like, and mixtures thereof. The aforementioned oils may be modified by alkali refining, blowing, or heat bodying.

The polyol utilized in carrying out the partial transesterification reaction can be selected from two separate classes of compounds: (1) low molecular weight polyols exemplified by ethylene glycol, glycerol, trimethylol propane, pentaerythritol, and the like, and those corresponding to the formulae:

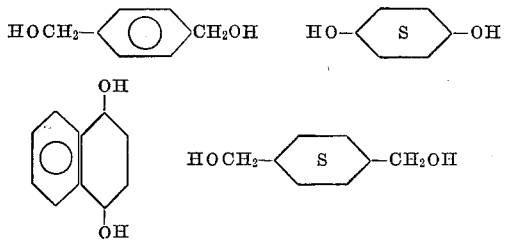

and the like, and their non-interfering substituted derivatives; and (2) polymeric polyols such as polyether polyols, polyester polyols, polyurethane polyols, and polychlorohydrins having terminal hydroxyl groups. By polymeric polyols is meant a conventional polyether or polyester containing hydroxyl groups and having a molecular weight of from about 300 to about 5000, and polyurethane polyols such for example as the polymer derived from hexamethylene diisocyanate and ethylene glycol, or the one derived from trimethylol propane and p-xylylene diisocyanate.

The catalysts used in carrying out the transesterification reaction between the esters and the polyols include lead oxide, calcium naphthenate, sodium hydroxide, potassium hydroxide, calcium oxide, and similar commercial catalysts. Of this group, lead oxide and calcium naphthenate are preferred.

As indicated hereinabove, the hydroxylated polyesters utilized in forming the drying oils of the present invention are prepared by reacting a hydroxyl-containing ester of the type described with a polycarboxylic acid or the anhydride thereof. Exemplary of acids and anhydrides which can be used for this purpose are saturated and unsaturated aliphatic dicarboxylic acids such as malonic acid, malic acid, succinic acid, tartaric acid, glutaric aid, adipic acid, pimelic acid, citraconic acid, fumaric acid, maleic acid, and the like, and the anhydrides thereof; and dicarboxylic aromatic acids such as terephthalic acid, phthalic acid, isophthalic acid, uvitic acid, cumidinic acid, and the like, and anhydrides of such acids. The reaction between the product of the transesterification reaction and the acid or acid anhydride is in the nature of an esterification-condensation reaction and is such that a portion at least of the free, reactive hydroxyl groups of the transesterification reaction product is left unreacted.

The organic dihalides having utility for the purposes of this invention can be selected from a wide group. Exemplary of organic dihalides which can be used are aliphatic dihalides such as methylene chloride, methylene bromide, ethylene dichloride, ethylene dibromide, ethylidene chloride, ethylidene bromide, trimethylene dichloride, trimethylene dibromide, tetramethylene dichloride, tetramethylene dibromide, pentamethylene dichloride, pentamethylene dibromide, hexamethylene dichloride, hexamethylene dibromide, hexamethylene diiodide, heptamethylene dichloride, heptamethylene dibromide, heptamethylene diiodide, octamethylene dichloride, octamethylene dibromide, octamethylene diiodide, 1,4-di(chloromethyl)cyclohexane, 1,4 - di(bromomethyl)cyclohexane, 1,3 - di(chloromethyl)cyclohexane, 1,3-di(bromomethyl)cyclohexane, 1,4-dichloro-2-butene, 1,4-dibromo-2-butene, 3,4-dichloro-1-butene, 3,4-dibromo-1-butene, 1,5-dichloropentene-2, 1,5-dibromo-pentene-2, and the like; and aromatic dihalides wherein the halogens are not bonded directly to the aromatic ring but are substituted on carbon atoms attached directly to the aromatic ring or nucleus, examples of which are p-xylylene dichloride, p-xylylene dibromide, m-xylylene dichloride, m-xylylene dibromide, 4-methyl-1,3-xylylenedichloride, 4-methyl-1,3-xylylene dibromide, 2,7-di(chloromethyl)naphthalene, 2,7-di(bromomethyl)naphthalene, 1,4 - di(chloromethyl)naphthalene, 1,5-di(chloromethyl)naphthalene, and the like. Substituted derivatives of organic dihalides of the type mentioned can be utilized. However, the substituents should not be capable of interfering with the reaction between the hydroxylated polyester, the organic dihalide and the metal cyanate.

The metal cyanates useful in preparing the urethane drying oils of the present invention also can be selected from a wide group. The term "metal" as used herein in relation to the metal cyanates is intended to include organic radicals such, for example, as the pyridinium and tetraalkyl ammonium radicals, which act as metals in the reaction mixture. Exemplary of metal cyanates having utility for the purposes of this invention are lithium cyanate, sodium cyanate, potassium cyanate, rubidium cyanate, cesium cyanate, silver cyanate, beryllium cyanate, calcium cyanate, magnesium cyanate, lead cyanate, and the like. Of this group, potassium cyanate and sodium cyanate are preferred.

The ratio of hydroxyl groups as represented by the hydroxyl-containing polyester to organic dihalide to metal cyanate present in the reaction mixture is somewhat variable. The generally optimum objectives of the invention are attained, however, with approximately stoichiometric or theoretical proportions thereof, namely, a hydroxyl group to dihalide to cyanate mole ratio of the order of about 2:1:2, with especially satisfactory results obtainable when the dihalide and the cyanate are used in slight excess, or in a mole ratio of hydroxyl groups to halide to cyanate of from about 2 of the hydroxyl groups to about 1.1 to about 1.5 of the dihalide to about 2.1 to about 2.3 of the cyanate.

As indicated, the reaction between the hydroxyl-containing polyester, the organic dihalide and the metal cyanate advantageously is carried out in a solvent medium. Optimum results are obtained when aprotic dipolar solvents are employed. Aprotic solvents useful in this connection are characterized in that (1) they are liquid under the conditions of the reaction; (2) they have a high dielectric constant, i.e., greater than about 15 at 25° C.; (3) they are dipolar, i.e., one part of the molecule has a more positive electrical charge relative to the other parts of the molecule thereby causing the molecule to act as a dipole; (4) they are sufficiently inert not to enter into deleterious side reactions to any appreciable extent under the conditions of the reaction; and (5) they do not possess hydrogen atoms capable of hydrogen bonding with or transferring to anions in solution in the reaction mixture. A mixture of solvents satisfying the foregoing criteria can, of course, be used. Specific examples of solvents useful for the purposes of this invention are alkyl pyrrolidones such as N-methyl-pyrrolidone-2 and N-ethyl-pyrollidone; sulfoxides exemplified by dimethylsulfoxide and diethylsulfoxide; sulfones such as dimethylsulfone and dipropylsulfone; alkyl amides including N,N-dimethylformamide, N,N-diethylformamide, N,N-dimethylacetamide and N,N-diethylacetamide; alkylphosphoramides and arylphosphoramides such as hexamethylphosphoramide, hexaethylphosphoramide and hexaphenylphosphoramode; nitriles examples of which are acetonitrile and benzonitrile; alkylureas such as tetramethylurea and tetraethylurea; and the like, and compatible mixtures thereof.

While not absolutely essential to the reaction of the present invention, a catalyst will be preferred. The most preferred catalysts are organo tin catalysts such as dibutyl tin dilaurate, dibutyl tin di-2-ethylhexoate, dibutyl tin diacetate, dibutyl tin oxide, dibutyl tin dichloride, and dibutyl tin dioleate with the first three being most preferred. The catalyst is preferably present in concentrations from 0.1 to about 30 and most preferably from 0.5 to about 10.0 mole percent based on the replaceable halogen in the organic dihalide.

The temperature at which the reaction between the hydroxyl-containing polyester, the organic dihalide and the metal cyanate is carried out is variable. Generally speaking, the temperatures employed will range from about 25° C. to about 300° C., usually from about 50° C. to about 200° C. Pressure is not critical and may be from below one atmosphere to over 10,000 p.s.i.g. In most cases, it will be preferable to conduct the reaction anaerobically and maintain anhydrous conditions on a batch-type basis, although flow systems may be utilized. The most convenient apparatus will in most cases be a conventional tight-lid varnish cooker or similar reactor having a reflux condenser, provision for agitation, and the usual controls for temperature and pressure.

In order that the full details of the present invention will be even better understood, the following examples are provided. These examples are illustrative of the practice of the method of the invention and it should be understood that variations may be made therein in a number of particulars without in any way departing from the fundamental principles and teachings provided herein. The examples, therefore, are not to be construed in any way as limitative of the scope of the invention.

EXAMPLE I 220 g. of safflower oil (0.25 mole) is mixed with 34.0 g. of pentaerythritol (0.25 mole) in a resin pot equipped with an overhead stirrer, nitrogen inlet and thermometer. Nitrogen is bubbled through the mixture at 0.04 cu. ft./gal. min. and the temperature is raised to 235° C. Upon reaching temperature 0.68 g. of ca. octoate catalyst is added. After stirring for 50 minutes at temperature 37.0 g. of phthalic anhydride (0.25 mole) is added and the mixture stirred for an additional 3 hrs. at 235° C. The solution is then cooled to room temperature and analyzed; acid number=2.69, hydroxyl No.=121. 50 g. of the above product (0.107 mole of OH) is diluted with 150 ml. of dimethylformamide. 9.0 g. of p-xylylene dichloride (0.103 mole of Cl), 9.70 g. of KNCO (0.120 mole) and 0.63 g. of dibutyltin dilaurate are added. The mixture is heated to 100° C. for 2.5 hrs. with good stirring under a nitrogen atmosphere. The solution is then cooled to room temperature, filtered and the dimethylformamide stripped off. The resulting resin is then dissolved in mineral spirits and treated with sodium bisulfate to remove excess cyanate ion. The sodium bisulfate is then filtered off and the solids content of the solution adjusted to 65% by removing some of the mineral spirits. 0.2% Pb and 0.02% Co in the form of the naphthenates are then added as driers.

The resulting coating solution has a Gardner viscosity of T at 65% solids. This coating solution is then applied to a steel panel, four mil wet thickness. Tests of the coating show the following properties:

tack free time: 24 hours
Sward hardness:
    1 day: 4
    5 days: 24
    7 days: 28
Dry film thickness: 1.0 mil
Forward impact: passes 120 in lb.
Reverse impact: passes 120 in lb.
Mandrel: passes ⅛″

EXAMPLE II

Employing the procedure described in Example I, 220 g. of safflower oil is reacted with 34 g. of pentaerythritol and 25.9 g. of phthalic anhydride (0.175 mole). 50 g. of the above hydroxyl containing polyester is then reacted with 10.7 g. of p-xylene dichloride and 12.15 g. of KNCO as in Example I. The resulting product is formulated into a coating solution having a Gardner viscosity of M at 70% solids in mineral spirits.

This coating solution is then applied to a steel panel and tested, showing the following properties:

tack free time: 30 hrs.
Sward hardness:
    2 days: 2
    5 days: 8
    7 days: 18
Forward impact: passes 120 in lb.
Reverse impact: passes 120 in lb.
Mandrel: passes ⅛ inch

EXAMPLE III

Using the procedure of Example I, 220 g. of safflower oil is reacted with 34.0 g. of pentaerythritol and 55.5 g. of phthalic anhydride (0.375 mole). 70 g. of the above hydroxyl containing polyester is then reacted with 5.44 g. of p-xylylene dichloride and 8.10 g. KNCO as described in Example I. The resulting product is formulated into a coating solution having a Gardner viscosity of V at 70% solids in xylene.

This coating solution is the applied to a steel panel and tested, showing the following properties:

tack free time: 8 hrs.
Sward hardness:
    1 day: 8
    3 days: 20
    7 days: 28
Forward impact: passes 120 in lb.
Reverse impact: passes 120 in lb.
Mandrel: passes ⅛ inch

EXAMPLES IV–XIII

Similar results are obtained when the following reactants are reacted together according to the procedures of Example I, using the same numbers of equivalents:

| Example | Fatty acid ester | Polyol | Diacid or Anhydride | Dihalide |
| --- | --- | --- | --- | --- |
| IV | Safflower oil | Pentaerythritol | Phthalic anhydride | Metaxylylene dichloride. |
| V | do | Glycerol | do | Do. |
| VI | do | Trimethylol propane | do | Do. |
| VII | do | do | Succinic anhydride | 1,4-dichlorobutene-2. |
| VIII | do | Glycerol | do | Do. |
| IX | do | do | Maleic anhydride | Do. |
| X | do | Trimethylol propane | do | Do. |
| XI | Linseed oil | do | do | Do. |
| XII | do | Pentaerythritol | do | Do. |
| XIII | do | do | do | Methaxylylene dichloride. |

The drying oils of the present invention are useful for all of the purposes to which conventionally produced urethane drying oils are put and the method of application will, in general, be those well known to persons skilled in the art. For example, the coatings may be brushed, rolled, sprayed, flow-coated or otherwise conventionally applied to substrates which can include stone, metal, wood, plastics, glass, concrete and cinder block aggregates, etc. The substrates will usually be flat sheets but can also be other shapes as where the drying oils are used for varnishing wires to protect against corrosion or as insulating materials. Architectural shapes including wrought iron can also be so coated. Clear wood finishes will be the most preferred use of the urethane drying oils of the present invention. Additional conventional drying oils may be admixed where they do not interfere with the invention.

What is claimed is:

1. A process for the manufacture of urethane drying oils containing unsaturation having a formula corresponding to:

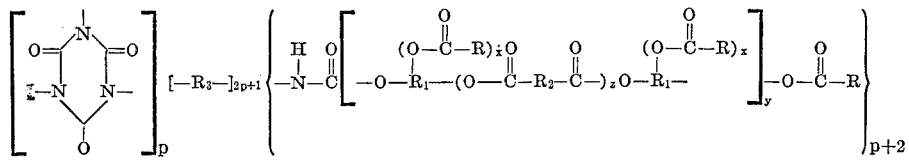

wherein R is a monovalent unsaturated hydrocarbon radical containing from 1 to 5 double bonds and having from 5 to about 30 carbon atoms; $R_1$ is a polyvalent hydrocarbon radical containing from 1 to about 20 carbon atoms; $R_2$ is a divalent organic radical selected from the group consisting of saturated and unsaturated aliphatic radicals, and aromatic radicals; $R_3$ is a xylylene divalent organic radical derived from a xylylene dihalide and wherein the halogen atoms are substituted on saturated carbon atoms; X is 1 to 5; Y is 1 to 5; Z is 0 or 1; $p$ averages from about 0.1 to 15.0, comprising forming a reaction mixture of a hydroxyl-containing ester and a dicarboxylic acid or the anhydride thereof, partially reacting the ester with the polycarboxylic acid or the anhydride to provide a hydroxylated polyester, and contacting at from about 25 to about 200° C. the hydroxylated polyester with a xylylene dihalide and an alkali metal cyanate wherein the hydroxyl-containing ester is a partial ester of an unsaturated fatty acid and a polyol and wherein the hydroxylated polyester is contacted with the xylylene dihalide and alkali metal cyanate in the presence of a dipolar aprotic solvent selected from the group consisting of alkylpyrrolidones, dialkyl sulfones, N,N-dialkylamides, alkylphosphoramides and arylphosphoramides, organic nitriles, alkylureas and mixtures thereof.

2. A method according to claim 1 wherein the hydroxylated polyester is a partial ester of an unsaturated fatty acid and a polyol.

3. A method according to claim 1 wherein the mole ratio of hydroxyl groups to dihalide to cyanate in the reaction mixture is about 2:1:2 and wherein the xylene dihalide is a xylene dichloride.

4. A process according to claim 1 wherein the hydroxylated polyester is contacted with the xylene dichloride and the alkali metal cyanate in the presence of an organic tin catalyst selected from the group consisting of dibutyltin dilaurate, dibutyltin di-2-ethylhexoate, dibutyltin diacetate, dibutyltin oxide, dibutyltin dichloride, and dibutyltin dioleate.

5. A process according to claim 1 wherein $R_3$ is a p-xylylene divalent organic radical derived from a p-xylylene dihalide.

6. A process according to claim 1 wherein $R_3$ is a xylylene divalent organic radical derived from a 4-methyl-1,3-xylylene dihalide.

7. A process according to claim 1 wherein R is a monovalent unsaturated hydrocarbon radical derived from safflower oil.

8. A process according to claim 1 wherein R is a monovalent unsaturated hydrocarbon radical derived from linseed oil.

9. The process of claim 1 wherein the aprotic solvent is a polyvalent hydrocarbon radical dimethylformamide, the alkali metal cyanate is sodium cyanate and wherein $R_1$ is derived from pentaerythritol.

References Cited

UNITED STATES PATENTS

| 3,437,500 | 4/1969 | Hennig et al. | 260—77.5 |
| 3,448,084 | 6/1969 | Burdick et al. | 260—75 |
| 3,458,448 | 7/1969 | Argabright et al. | 252—182 |

FOREIGN PATENTS

| 947,973 | 1/1964 | Great Britain | 260—22 |
| 6,515,058 | 5/1966 | Netherlands | 260—77.5 |

HOSEA E. TAYLOR, Primary Examiner
R. W. GRIFFIN, Assistant Examiner

U.S. Cl. X.R.

117—132, 161; 260—30.6, 30.8, 32.4, 32.6, 33.6, 75, 77.5

UNITED STATES PATENT OFFICE
CERTIFICATE OF CORRECTION

Patent No. 3,553,122                    Dated  Jan. 5, 1971

Inventor(s)  P. A. Argabright, et al

It is certified that error appears in the above-identified patent and that said Letters Patent are hereby corrected as shown below:

Col. 1, lines 58-67:  The structure should read as follows:

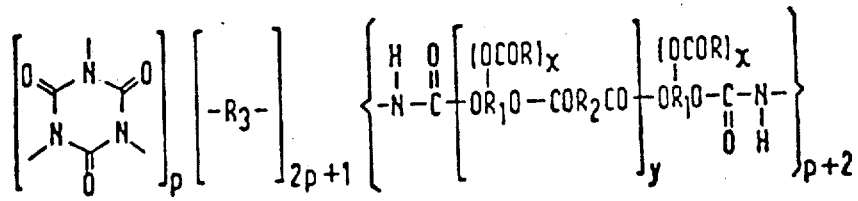

Col. 1, before line 69, insert:  --wherein N-N bonds are absent and Y is not equal to zero and--

Claim 1:  The structure should read as follows:

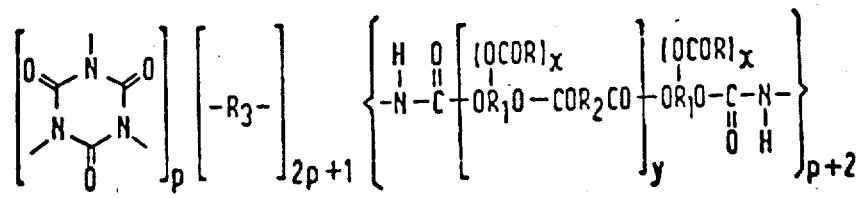

Claim 1, line 21:  "Z is 0 or 1:" should be deleted.

Cancel at Column 2, line 15:  "and Z is 0 or 1;"

Signed and sealed this 5th day of March 1974.

(SEAL)
Attest:

EDWARD M. FLETCHER, JR.                C. MARSHALL DANN
Attesting Officer                      Commissioner of Patents